E. H. FAHRNEY.
DEVICE FOR MEASURING SPEED OF MOVING CRAFT OR VEHICLES.
APPLICATION FILED JUNE 3, 1907.
919,707.
Patented Apr. 27, 1909.
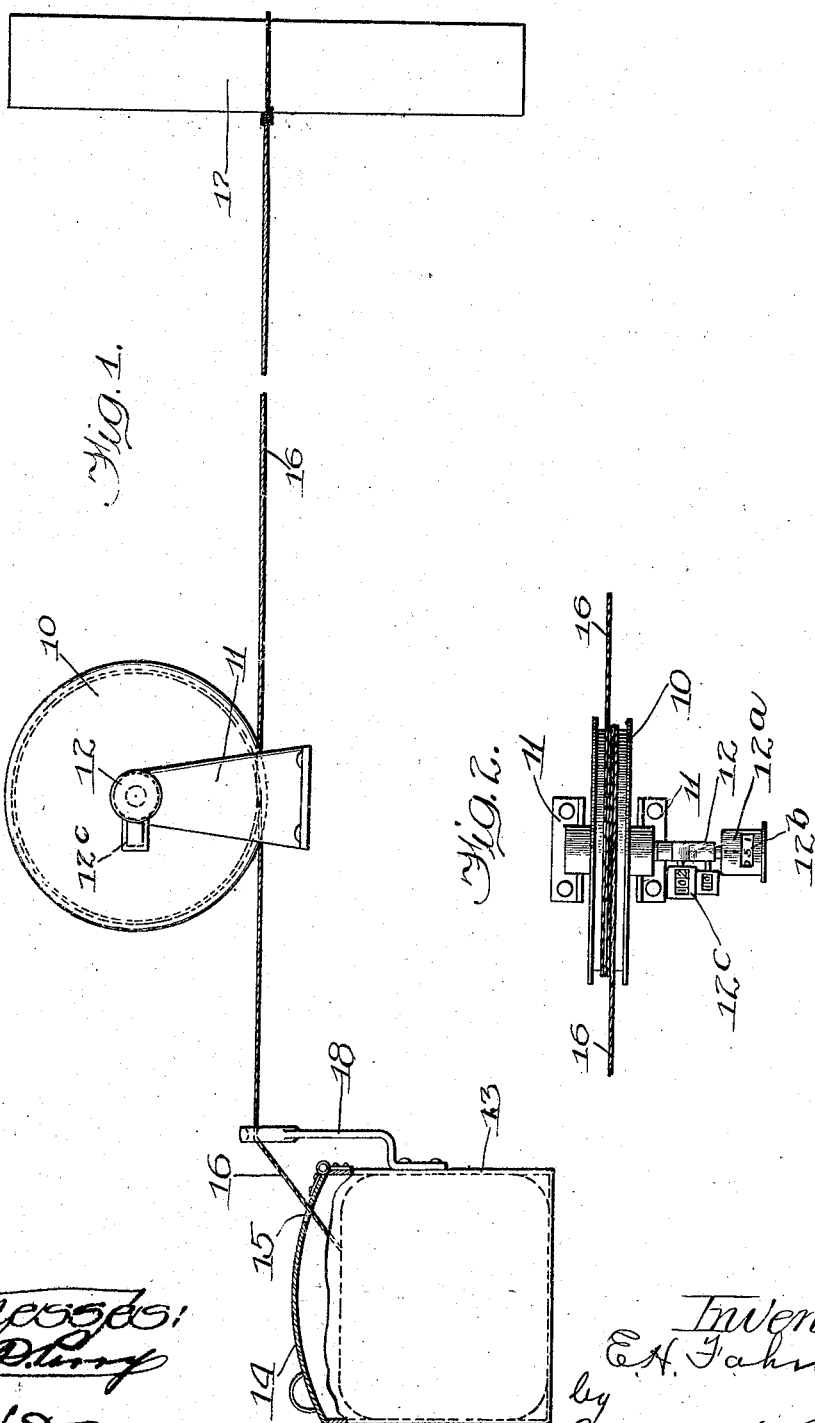

UNITED STATES PATENT OFFICE.

EMERY H. FAHRNEY, OF CHICAGO, ILLINOIS.

DEVICE FOR MEASURING SPEED OF MOVING CRAFT OR VEHICLES.

No. 919,707.  Specification of Letters Patent.  Patented April 27, 1909.

Application filed June 3, 1907. Serial No. 376,987.

*To all whom it may concern:*

Be it known that I, EMERY H. FAHRNEY, a citizen of the United States, residing at Chicago, in the county of Cook and State of Illinois, have invented certain new and useful Improvements in Devices for Measuring Speed of Moving Craft or Vehicles, of which the following is a full, clear, and exact specification.

The invention relates to devices for measuring speed of water craft, or of vehicles of any description when such measurements are desired to be taken from the craft or vehicle under motion.

The primary object of the invention is to provide an improved form of measuring device that is accurate, easily operated and efficient, and at the same time simple in construction and economical both in initial cost of production and expense of maintaining the same.

To the attainment of these ends and the accomplishment of other new and useful objects as will appear, the invention consists in the features of novelty in the construction, combination and arrangement of the several parts hereinafter more fully described and claimed and set forth in the accompanying drawing, in which:

Figure 1 is a side elevation view of the entire device, portions of the same being broken away or shown in section, as presently described; Fig. 2 is a top plan view of the speed drum or reel, with the indicating mechanism attached thereto.

Heretofore, in order to determine the speed of vessels moving through the water by persons on board the vessels, it has been the practice to cast overboard from the stern of the vessel an object to which a cord or log-line is attached, one end of the cord remaining on the vessel, the object to which the cord is attached being preferably of a character that, when it strikes the water, will offer sufficient resistance to cause the cord attached thereto to be drawn from a suitable cord holder, and the speed of the vessel for a given time may be determined by the amount of the cord passing overboard during the given period of time, the amount of the cord thus passing overboard being determined in any suitable manner, as for example, by knots placed therein at suitable intervals. Another device in common use for the same purpose is a small wheel having inclined blades or paddles similar to the ordinary propeller wheel, and the speed of the vessel being determined by the speed of rotation of such wheel while being drawn through the water.

The present invention comprises a suitable reel or drum 10 mounted to rotate freely in any suitable manner, as for example, the supports 11, which may be provided with suitable bearings to a central trunnion or shaft, or any other suitable means for pivotally mounting the reel or drum. The periphery of the reel or drum is preferably provided with suitable flanges or other means adapted to retain a cord passed around the same, and connected to the reel or drum in some suitable manner, as for example, secured to the revolving axis or pivotal portion thereof, is a device of any desired construction adapted to measure or gage the speed of rotation of the reel or drum. A device of this character is shown in the drawing, being indicated by the reference character 12, consisting of well known mechanism as commonly used for measuring both the speed and distance traveled on motor vehicles. In the device shown in this embodiment of the invention, the portion $12^a$ is provided with a suitable speed registering indicator $12^b$, while the portion $12^c$ is provided with two distance indicators, one of which may be used, if desired, as an accumulator. It will be apparent that if a suitable cord be secured to the periphery of the reel or drum 10, with a free end which may be attached to an object to be thrown overboard to contact with the element through which or over which the craft or vehicle is moving, the rate of speed and the distance traveled for any given interval will be shown on the indicators just described.

The preferred form of practicing the invention is to provide a twine or cord which may be retained in a suitable receptacle, as for example, the twine can or retainer shown in Fig. 1, the body of which is indicated by the reference character 13, and being provided with a suitable cover 14 having an eyelet or hole 15 therein through which the cord 16 is taken from the receptacle, and after being wound one or more times around the reel or drum 10, is secured to a suitable object, as for example, the wooden piece or stick, as illustrated by the reference character 17. After passing from the receptacle, the twine in the illustration is shown threaded through a suitable eye or guide slot at the upper extremity of the member 18, which may be secured to the receptacle or in any other suitable manner. Any suitable twine or cord may be employed for this purpose, and if it is not desired to return the object cast overboard and the twine which is paid from the reel or drum, to the vessel, the twine may be clipped or broken when the desired measurements are secured. The material, size and shape of the object 17 may be determined by the conditions under which the device is to be used, and the cheapest form of material, such as wood, may be employed for the purpose, and the expense of providing the object to be cast overboard with each measurement will ordinarily not be commensurate with the expense and difficulty involved in returning the same for subsequent use.

In order that the invention might be fully understood, the details of one embodiment thereof have been thus specifically described, but

What I claim is:

1. In a device of the character described the combination of a rotatably mounted reel or drum, a cord or log line wrapped one or more times around the outer periphery of the said reel or drum, a receptacle for containing the bulk of the cord or log line, means for guiding the cord as it is paid to the said reel or drum, an object for casting overboard secured to the free end of the cord, and a speed indicator operatively connected with the said reel or drum.

2. In a device of the character described, the combination of a rotatably mounted reel or drum, a holder adjacent the reel containing a supply of log line, one end of the line leading from the holder and being wrapped one or more times around the periphery of the reel, an object secured to the said end of the line for casting overboard to separate the ends of the line to cause the reel to rotate to pay out the said end of the line and to wind a supply of said line on the reel from the holder, and a combined speed and distance indicating mechanism operatively connected with said reel.

In testimony whereof I have signed my name to this specification, in the presence of two subscribing witnesses, on this 27th day of May, A. D. 1907.

EMERY H. FAHRNEY.

Witnesses:
E. J. RYAN,
F. C. SCHUMACHER.